(12) United States Patent
Gurevich et al.

(10) Patent No.: US 12,417,364 B2
(45) Date of Patent: *Sep. 16, 2025

(54) MINIATURE LONG RANGE IMAGING ENGINE WITH AUTO-FOCUS AND AUTO-ZOOM SYSTEM

(71) Applicant: ZEBRA TECHNOLOGIES CORPORATION, Lincolnshire, IL (US)

(72) Inventors: Vladimir Gurevich, Great Neck, NY (US); Christopher W. Brock, Manorville, NY (US); David Tsi Shi, Setauket, NY (US); David P. Goren, Smithtown, NY (US); Carl D. Wittenberg, Water Mill, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,609

(22) Filed: Aug. 14, 2023

(65) Prior Publication Data
US 2023/0385576 A1    Nov. 30, 2023

Related U.S. Application Data

(63) Continuation of application No. 17/498,421, filed on Oct. 11, 2021, now Pat. No. 11,790,197.

(51) Int. Cl.
*G06K 7/10* (2006.01)
*G03B 13/36* (2021.01)
(Continued)

(52) U.S. Cl.
CPC ......... *G06K 7/10881* (2013.01); *G03B 13/36* (2013.01); *H04N 23/56* (2023.01);
(Continued)

(58) Field of Classification Search
None
See application file for complete search history.

(56) References Cited

U.S. PATENT DOCUMENTS 7,303,131 B2    12/2007   Carlson et al.
11,790,197 B2*  10/2023   Gurevich ........... G06K 7/10881
                                                        235/454
(Continued)

FOREIGN PATENT DOCUMENTS

| CN | 111971681 A | 11/2020 |
| TW | 201824064 A | 7/2018 |
| WO | 20170205065 A1 | 11/2017 |

OTHER PUBLICATIONS

International Search Report and Written Opinion for International Application No. PCT/US2022/045028 mailed on Jan. 12, 2023.
(Continued)

*Primary Examiner* — Kristy A Haupt

(57) ABSTRACT

Methods and systems to implement a miniature long range imaging engine with auto-focus, auto-zoom, and auto-illumination are disclosed herein. An example method includes detecting, by a microprocessor, a presence of an aim light pattern within the FOV; determining, by the microprocessor and in response to the detecting, a target distance of an object in the FOV based on a position of the aim light pattern in the FOV, the target distance being a distance from the imaging engine to the object; causing, by the microprocessor, a variable focus optical element to focus on the object based on the target distance; and responsive to making a first determination, by the microprocessor, selecting, based on the target distance, one of a plurality of zoom operation modes.

22 Claims, 12 Drawing Sheets

(51) Int. Cl.
  *H04N 23/56* (2023.01)
  *H04N 23/58* (2023.01)
  *H04N 23/63* (2023.01)
  *H04N 23/67* (2023.01)

(52) U.S. Cl.
  CPC ........... *H04N 23/58* (2023.01); *H04N 23/633* (2023.01); *H04N 23/671* (2023.01)

(56) References Cited

U.S. PATENT DOCUMENTS

| | | | |
|---|---|---|---|
| 2009/0084851 A1* | 4/2009 | Vinogradov | G06K 7/14 |
| | | | 235/462.21 |
| 2010/0096461 A1 | 4/2010 | Kotlarsky et al. | |
| 2010/0155485 A1* | 6/2010 | Tan | G06K 7/10702 |
| | | | 235/462.42 |
| 2011/0156869 A1 | 6/2011 | Watt | |
| 2013/0292475 A1 | 11/2013 | Kotlarsky et al. | |
| 2018/0137318 A1 | 5/2018 | Canini et al. | |
| 2020/0011809 A1 | 1/2020 | Umakoshi | |
| 2020/0151412 A1 | 5/2020 | Ashby et al. | |
| 2020/0226337 A1 | 7/2020 | Powell et al. | |
| 2021/0103754 A1 | 4/2021 | Vinogradov et al. | |
| 2021/0110125 A1 | 4/2021 | Hurley, IV et al. | |
| 2021/0157994 A1 | 5/2021 | Astvatsaturov | |
| 2021/0240952 A1 | 8/2021 | Rodriguez Ortiz et al. | |

OTHER PUBLICATIONS

Search Report for Taiwanese Patent Application No. 111138418 mailed on Sep. 21, 2023.
GB Patent Examination Report received for GB Patent Application No. 2405069.2 mailed on Sep. 30, 2024.

* cited by examiner

MINIATURE LONG RANGE IMAGING ENGINE WITH AUTO-FOCUS AND AUTO-ZOOM SYSTEM

CROSS-REFERENCE TO RELATED APPLICATION

This application is a continuation of U.S. patent application Ser. No. 17/498,421, filed on Oct. 11, 2021, and incorporated herein by reference in its entirety.

BACKGROUND

Industrial scanners and/or barcode readers may be used in warehouse environments and/or other similar settings. These scanners may be used to scan barcodes and other objects. In some environments, high powered scanners capable of scanning or resolving barcodes (e.g., 5 millimeter to 100 millimeter wide, Code 128 barcodes) across a wide range of distances, such as from a few inches to tens of feet, or more, may be desirable. Such systems require larger optics (e.g., imaging lens systems greater than approximately 6 millimeters in overall diameter) in order to meet performance requirements, but there remains a compromise between the lens system having a specific size while being constrained by the overall dimensions of the housing and the chassis. Further, compact imaging systems require high precision alignment of optics to prevent optical distortion, which can result in reduced efficiency of scanning rates, or faulty equipment. Moreover, accurately scanning barcodes over a wide range of distances in a various environments requires appropriate focus, illumination, and zoom capabilities. Accordingly, there is a need for improved accessories having improved functionalities.

SUMMARY

In an embodiment, the present invention is a method for range finding and for detecting and imaging objects using an imaging engine having an imaging assembly having a field of view. The method includes detecting, by a microprocessor, a presence of an aim light pattern within the FOV; determining, by the microprocessor and in response to the detecting, a target distance of an object in the FOV based on a position of the aim light pattern in the FOV, the target distance being a distance from the imaging engine to the object; causing, by the microprocessor, a variable focus optical element to focus on the object based on the target distance; responsive to making a first determination, by the microprocessor, selecting, based on the target distance, one of a plurality of zoom operation modes; and, responsive to making a second determination, by the microprocessor, selecting, based on the target distance, one of a plurality of illumination modes.

In a variation of this embodiment, the plurality of zoom operation modes includes at least two of: (i) an image binning mode, (ii) an image cropping mode, and (iii) an image interleaving mode.

In another variation of this embodiment, selecting one of the plurality of zoom operation modes includes: responsive to determining the target distance to be less than a lower threshold value, selecting the image binning mode; responsive to determining the target distance to be greater than an upper threshold value, selecting the image cropping mode; and, responsive to determining the target distance to be between the lower threshold value and the upper threshold value, selecting the image interleaving mode.

In yet another variation of this embodiment, the lower threshold value is at most 12 inches and the upper threshold value is at least 24 inches.

In still yet another variation of this embodiment, the plurality of illumination operation modes includes at least two of: (i) a power saving mode, (ii) a near illumination mode, and (iii) a far illumination mode.

In another variation of this embodiment, selecting one of the plurality of illumination operation modes includes: responsive to determining the target distance to be less than a lower threshold value, selecting the power saving mode; responsive to determining the target distance to be greater than an upper threshold value, selecting the far illumination mode; and, responsive to determining the target distance to be between the lower threshold value and the upper threshold value, selecting the near illumination mode.

In yet another variation of this embodiment, the lower threshold value is at most 24 inches and the upper threshold value is at least 24 inches.

In still yet another variation of this embodiment, the microprocessor transmits a signal to cause the imaging engine to change to one of the plurality of illumination operation modes after a predetermined delay period elapses after making the determination.

In another variation of this embodiment, the microprocessor determines to change to a different one of the plurality of illumination operation modes during the predetermined delay period and the method further includes changing the signal based on the different one of the plurality of illumination operation modes before transmitting the signal; and resetting the predetermined delay period in response to the updating.

In yet another variation of this embodiment, the variable focus optical element is a ball-bearing motor lens.

In still yet another variation of this embodiment, the object is a barcode, and further includes: cropping a region of interest (ROI) including the barcode and decoding the barcode.

In another variation of this embodiment, the method further includes displaying, to a user, the target distance on a display communicatively coupled to the microprocessor.

In another embodiment, the present invention is an imaging engine for range finding and detecting objects, the imaging engine having an imaging assembly having a field of view (FOV). The imaging engine comprises a variable focus optical element disposed along an optical axis to receive light from an object of interest; an imaging sensor disposed along the optical axis to receive light from the variable focus optical element; a digital zoom module configured to modify an image received from the imaging sensor; an aiming module configured to generate and direct an aim light pattern; an illumination module configured to provide first illumination along a first illumination axis and second illumination along a second illumination axis, the illumination axis not coaxial with the first illumination axis; and a microprocessor and computer-readable media storing machine readable instruction that, when executed, cause the imaging engine to: detect a presence of the aim light pattern in the FOV; in response to the detecting, determine a target distance of the object in the FOV based on a position of the aim light pattern in the FOV, the target distance being a distance from the imaging engine to the object; responsive to making a first determination, select, based on the target distance, one of a plurality of zoom operation modes; and responsive to making a second determination, select, based on the target distance, one of a plurality of illumination operation modes; wherein the variable focus optical element, the digital zoom module, the aiming module, and the illumination module are communicatively coupled to the microprocessor.

In a variation of this embodiment, selecting one of the plurality of zoom operation modes includes: responsive to determining the target distance to be less than a lower threshold, selecting an image binning mode; responsive to determining the target distance to be greater than an upper threshold value, selecting an image cropping mode; and responsive to determining the target distance to be between the lower threshold value and the upper threshold value, selecting an image interleaving mode.

In another variation of this embodiment, the digital zoom module is configured to, responsive to selecting the image binning mode, bin pixels of the image using at least one of: 2×2 pixel binning, 3×3 pixel binning, or 4×4 pixel binning.

In yet another variation of this embodiment, the digital zoom module is configured to, responsive to selecting the image cropping mode, crop a portion of the image sized to at least one quarter of the image.

In still yet another variation of this embodiment, the digital zoom module receives the image with a resolution of at least 3 megapixels and zooms on the image with a resolution in a range of 0.5 to 2 megapixels.

In another variation of this embodiment, selecting one of the plurality of illumination modes includes: responsive to determining the target distance to be less than a lower threshold, selecting reduced power mode; responsive to determining the target distance to be greater than an upper threshold value, selecting a far illumination mode; and responsive to determining the target distance to be between the lower threshold value and the upper threshold value, selecting a near illumination mode.

In yet another variation of this embodiment, selecting the zoom operation mode includes: responsive to determining the target distance to be less than a first lower threshold, selecting an image binning mode; responsive to determining the target distance to be greater than a first upper threshold value, selecting an image cropping mode; and responsive to determining the target distance to be between the first lower threshold value and the first upper threshold value, selecting an image interleaving mode; and wherein selecting the illumination operation mode includes: responsive to determining the target distance to be less than a second lower threshold, selecting reduced power mode; responsive to determining the target distance to be greater than a second upper threshold value, selecting a far illumination mode; and responsive to determining the target distance to be between the second lower threshold value and the second upper threshold value, selecting a near illumination mode.

In still yet another variation of this embodiment, the first upper threshold value and the second upper threshold value are equal.

In another variation of this embodiment, the first upper threshold value and the second upper threshold value are at least 40 inches, the first lower threshold value is at most 8 inches, and the second lower threshold value is at most 24 inches.

In yet another variation of this embodiment, the imaging sensor is a rolling shutter sensor configured to operate in at least (i) a first state wherein an obfuscator of the rolling shutter sensor obfuscates a majority of radiation propagating along the optical axis and (ii) a second state wherein the obfuscator of the rolling shutter sensor transmits a majority of radiation propagating along the optical axis.

In still yet another variation of this embodiment, the rolling shutter sensor is communicatively coupled to the microprocessor and the machine readable instructions, when executed, further cause the imaging engine to transition the rolling shutter sensor between the first state and the second state.

In another variation of this embodiment, the rolling shutter sensor has a pixel size of at most 2.0 micrometers.

In yet another variation of this embodiment, the illumination module includes at least: a first illumination source configured to provide the first illumination; a second illumination source configured to provide the second illumination; a collimator element configured to collimate the first illumination and the second illumination; and a microlens array element configured to receive the first illumination and the second illumination from the collimator element and further to provide a first output illumination field and a second output illumination field.

In still yet another variation of this embodiment, the first illumination source includes a first white LED and the second illumination source includes a second white LED.

In another variation of this embodiment, the first output illumination field corresponds with a first modification of the image and the second output illumination field corresponds with a second modification of the image.

In yet another variation of this embodiment, at least one of the first output illumination field or the second illumination field extends at least 170 inches with no ambient light.

In still yet another variation of this embodiment, the aiming module includes at least a beam source assembly having a beam source for generating the aim light pattern from an exit surface, wherein the exit surface defines a central axis along which an input light is to propagate; and a collimator assembly having a lens group that defines a tilt axis, wherein the tilt axis has a tilt angle relative to the central axis and the lens group is positioned to aim light pattern from the central axis onto the tilt axis.

In another variation of this embodiment, the aiming module generates and directs the aim light pattern in a pulsed laser driving mode.

In yet another variation of this embodiment, the aim light pattern has a wavelength of at least 505 nanometers and at most 535 nanometers.

In still yet another variation of this embodiment, the variable focus optical element is a ball-bearing motor lens.

In another variation of this embodiment, the ball-bearing motor lens has a pupil diameter of at least 2.0 millimeters and a focus range from 3 inches to infinity.

In yet another variation of this embodiment, the object of interest is a barcode and wherein the machine readable instructions, when executed, further cause the imaging engine to decode the barcode.

In still yet another variation of this embodiment, the system further includes a display communicatively coupled to the microprocessor, wherein the machine readable instructions, when executed, further cause the imaging engine to display the distance to a user on the display.

In another variation of this embodiment, the imaging engine further comprises a chassis including a body defining at least one cavity, wherein each of the variable focus optical element, the imaging sensor, the digital zoom module, the aiming module, the illumination module, and the microprocessor and computer-readable media are each at least partially disposed within the at least one cavity.

In yet another variation of this embodiment, the imaging sensor is a single imaging sensor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
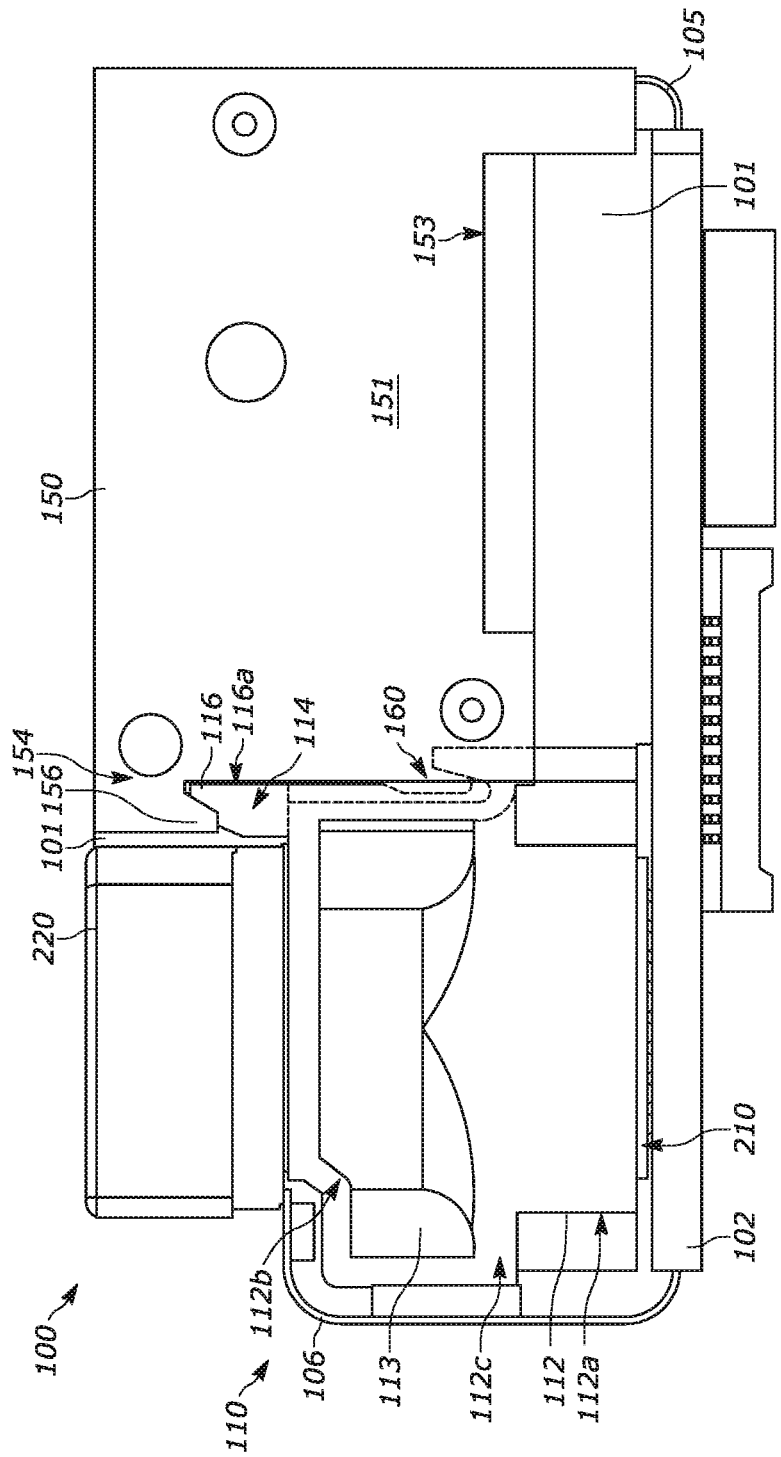
FIG. 1 illustrates a front elevation view of an example scanner containing an example imaging assembly for capturing images of an object in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a high-performance autofocus barcode scanner is provided having reduced dimensional requirements, and a broad range of autofocus distances. The scanner also incorporates optical alignment features that provide very high precision alignment of the imaging optics allowing for the use of smaller, more compact, lenses and optical elements. Further still, the scanner incorporates aiming units that generate aiming beams or aiming patterns using a compact, low-profile assembly that protects the aiming unit against detrimental back reflections of the aiming beam, back reflections that can otherwise flash blow out compact scanners as well as illumination units that allow for imaging of targets with little to no ambient light. To accurately focus and/or zoom on a target and control the illumination and aiming units, a controller of the scanner operates and adjusts various modules depending on the distance of a target being scanned.

In particular, a miniature imaging engine capable of providing high-resolution image capture for barcode reading and/or range finding over long distances is desired. Existing engines use multiple cameras to achieve varying fields of view (FOVs), requiring a larger and less efficient device. A single imaging sensor system is therefore preferable to existing engines. To achieve a sufficiently small pixel FOV so as to allow for long reading ranges for such a system, an illumination system is required to provide light for imaging. While an increased pupil for lenses in an imaging engine may increase efficiency, such an increase requires autofocusing capabilities to mitigate resulting decreased depth of focus. As such, an imaging engine with a single imaging sensor, a variable focusing lens, and a controller and/or microprocessor to control zooming, aiming, and focusing functions is described below.

Turning to the figures, an imaging engine device 100 or scan engine for capturing at least one image of an object appearing in an imaging field of view (FOV) is provided. The imaging engine device 100 includes a circuit board 102, an imaging system 110 operably coupled with the circuit board 102, and a chassis 150. Further, the system 100 includes an aiming system or aiming module 170 and an illumination system or illumination module 180, as well as any number of additional components used to assist with capturing an image or images of an object.

The circuit board 102 may include any number of electrical and/or electro-mechanical components (e.g., capacitors, resistors, transistors, power supplies, etc.) used to communicatively couple and/or control various electrical components of the imaging engine device 100. For example, the circuit board 102 may include any number of component mounting portions 103, illustrated in FIG. 2, to receive components (e.g., the imaging system 110) to operably couple therewith, and may additionally include a board mounting region 104 used to secure the circuit board 102 with the scanner housing (not illustrated). In the example illustrated in FIG. 2, the circuit board 102 further includes a first flex tail connector 105 and a second flex tail connector 106. As will be discussed, the first flex tail connector 105 is used to communicatively couple components disposed within the chassis 150 with the circuit board 102, and the second flex tail connector 106 is used to communicatively couple the circuit board 102 with portions of the imaging system 110 and/or with the aiming module 170.

In particular, the imaging system 110 may be communicatively coupled to a controller 107 of the circuit board 102. In some implementations, an optical sensor of the imaging system 110 receives light from one or more lenses of the imaging system 110 and, in response, transmits data such as one or more images to or via the controller 107. The controller 107 may cause the imaging system 110 or a digital zoom module 108 of the imaging system 110 to digitally zoom on some or all of the one or more images. Depending on the implementation, the one or more images may have a resolution of 4 megapixels, and the zoom may produce images with a resolution of 1 megapixel to be analyzed by the controller 107. One skilled in the art will understand that megapixels are approximate resolutions of a sensor and cover a range of potential pixel sizes. In some implementations, the controller 107 may cause the digital zoom module 108 of the imaging system 110 to operate in one of multiple zoom operation modes. In some implementations, the digital zoom module 108 may refer to a software module implemented on controller 107 which causes the imaging system 110 to perform particular functions. Depending on the implementation, some operation modes include a binning mode, a cropping mode, and an interleaved mode. The imaging system 110 may operate in the binning mode by binning pixels in the image (e.g., binning pixels in 2×2 pixel squares). Similarly, the imaging system 110 may operate in the cropping mode by cropping an ROI of the image (e.g., a quarter of the image). The imaging system 110 may also operate in the interleaved mode by combining the binning and cropping mode operations. The controller 107 determines the mode as described in more detail with regard to FIG. 10 below.

The imaging system 110 is also operably coupled with the circuit board 102. The imaging system 110 includes an autofocus system or autofocus module 220 and a rear lens holder 112, both containing lenses for imaging. In some implementations, the autofocus module 220 includes a variable focus optical element. Depending on the implementation, the lenses for imaging may be or include the variable focus optical element. In a preferred embodiment, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a pupil diameter of at least 2.0 millimeters and a focus range from 3.0 inches extending infinitely (i.e., to optical infinity). In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 107 may control the autofocus module 220 and/or the variable focus optical element.

The autofocus module 220 is positioned adjacent to and/or operably coupled with the rear lens holder 112. The rear lens holder 112 is in the form of a generally hollow body that defines a lower portion 112*a*, an upper portion 112*b*, and a sidewall 112*c* extending between the lower and upper portions 112*a*, 112*b*. The rear lens holder 112 may have any number of features such as shapes and/or cutouts 113 such that the sidewall 112*c* has a generally uniform thickness despite its particular shape that corresponds to the shape of the lens or lenses disposed therein. These cutouts 113 reduce overall weight of the rear lens holder 112, and, due to the uniform thickness of the sidewall 112*c*, the rear lens holder 112 is easier to manufacture (e.g., mold via an injection molding machine) as compared with lens holders having varying thickness.

In some examples, the rear lens holder 112 is coupled with the circuit board 102 via the component mounting portion 103. As a non-limiting example, the component mounting portion 103 may be in the form of a pad onto which the lower portion 112*a* of the rear lens holder 112 is pressed. The component mounting portion 103 may include an adhesive to assist in securing the rear lens holder 112 to the circuit board 102. In other examples, the component mounting portion 103 may include any number of electrical interconnects that receive corresponding electrical interconnects disposed or otherwise coupled with the rear lens holder 112. Other examples are possible.

Figure 2:
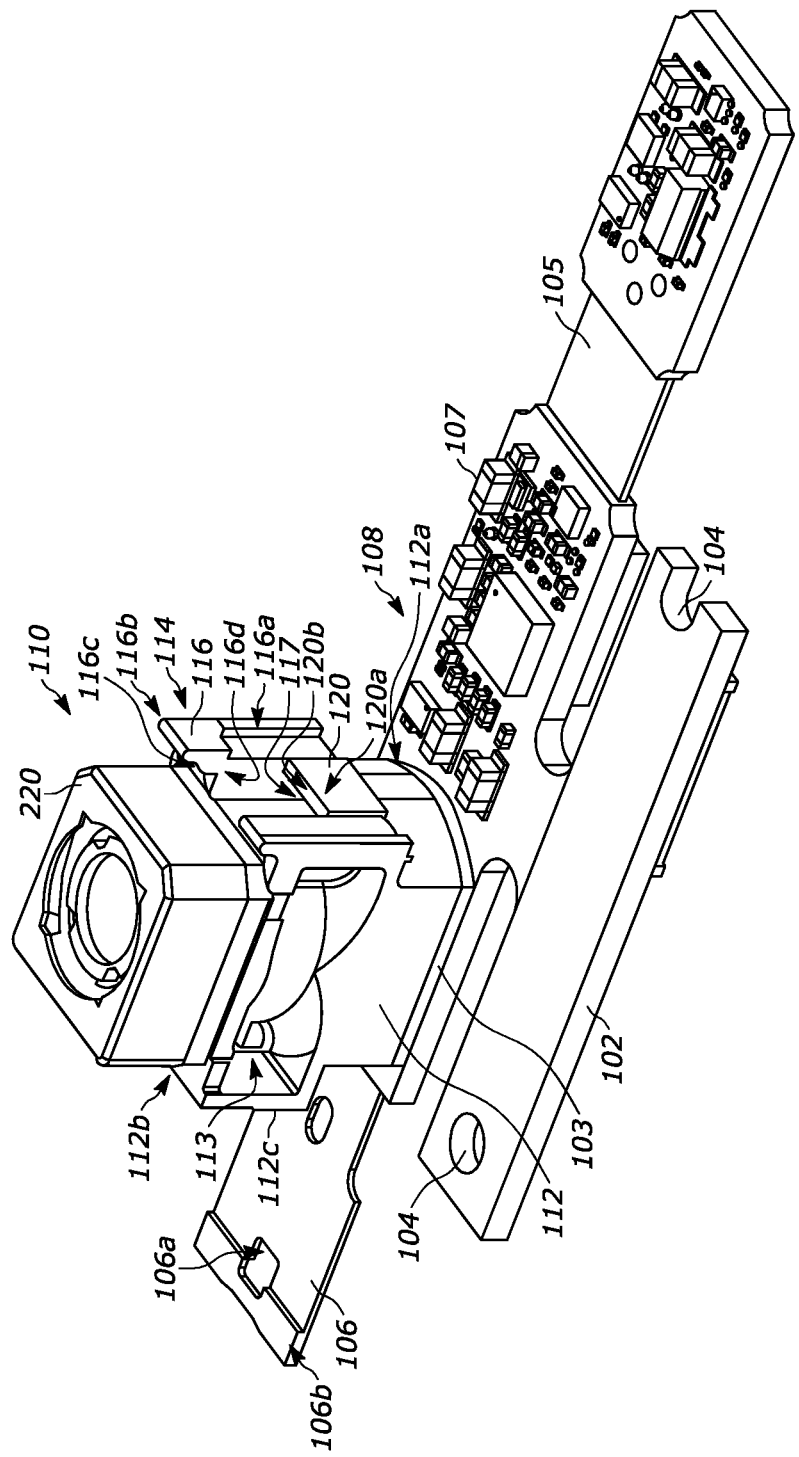
FIG. 2 illustrates a perspective view of the example imaging assembly of FIG. 1 in accordance with various embodiments.
Figure 3:
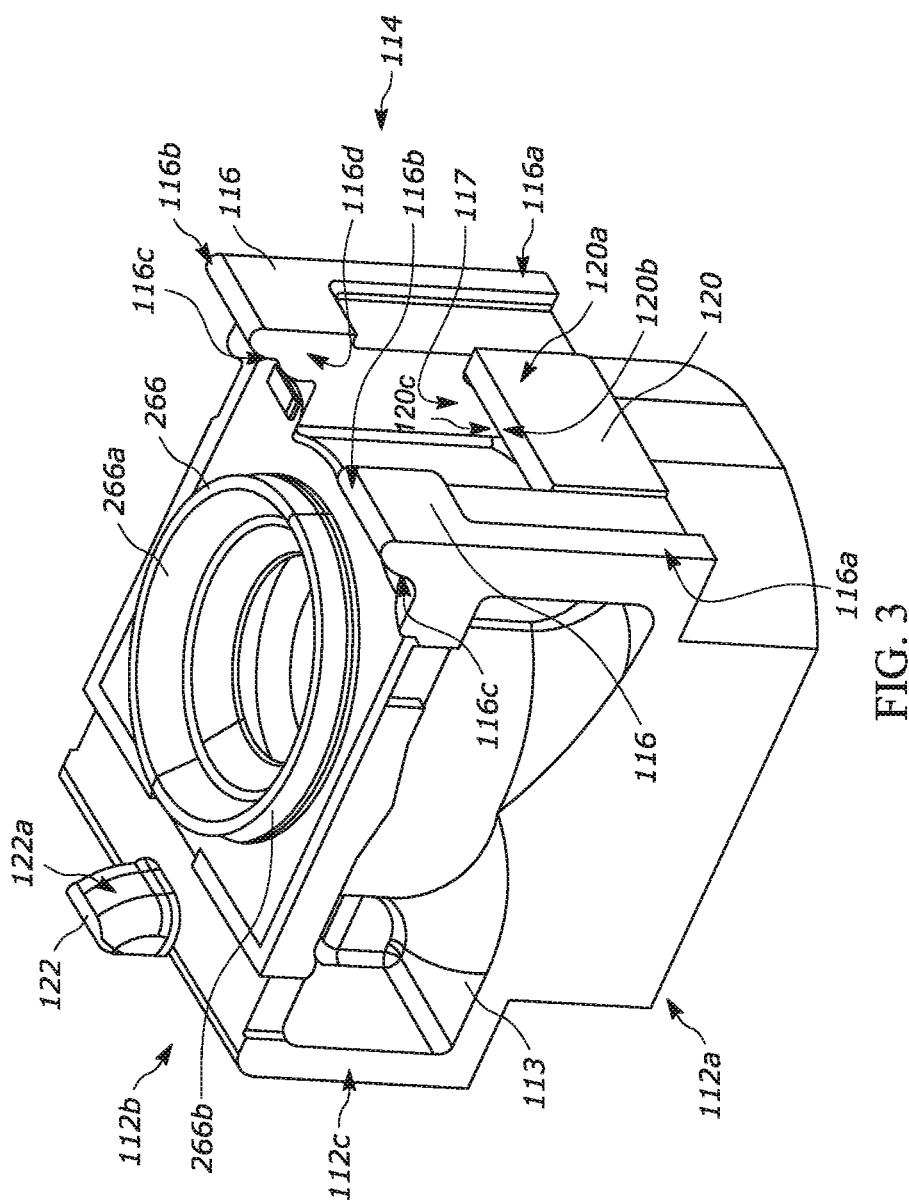
FIG. 3 illustrates a perspective view of an example lens holder for use with the example imaging assembly of FIGS. 1 and 2 in accordance with various embodiments.

Referring next to FIG. 3, the rear lens holder 112 further includes a lens holder mounting portion 114 positioned on an outer periphery of the sidewall 112*c*. The lens holder mounting portion 114 includes any number of upper tabs 116 and any number of lower tabs 120. As illustrated in FIGS. 2 and 3, each of the upper tabs 116 includes a generally planar facing surface 116*a*, a curved upper surface 116*b* positioned adjacent to the facing surface 116*a*, an angled surface 116*c* positioned adjacent to the curved upper surface 116*b*, and an inner sidewall 116*d* positioned adjacent to the facing surface 116*a*, the curved upper surface 116*b*, and the angled surface 116*c*. In the illustrated example, the respective inner sidewalls 116*d* of each of the upper tabs 116 are arranged such that they face each other. The angled surface 116*c* is a generally planar surface that forms an angle relative to the facing surface 116*a* of approximately 30°. However, other examples of suitable angles are possible.

Each of the upper tabs 116 are separated by a cavity 117 at least partially defined by the inner sidewall 116*d*. The cavity 117 is further defined by the lower tab 120, which includes a generally planar facing surface 120*a*, an upper surface 120*b* positioned adjacent to the facing surface 120*a*, and an angled surface 120*c* positioned adjacent to the upper surface 120*b*. The angled surface 120*c* is a generally planar surface that forms an angle relative to the facing surface 120*a* of approximately 30°. However, other examples of suitable angles are possible. Further, while the upper surface 120*b* of the lower tab 120 is illustrated as a generally planar surface, in some examples, the upper surface 120*b* of the lower tab 120 may be curved. So configured, the cavity 117 is at least partially defined by the inner sidewalls 116*d* of the upper tabs 116, the sidewall 112*c*, and the angled surface 120*c* of the lower tab 120. In some examples, the width of the cavity 117 may gradually decrease from the upper portion 112*b* to the lower portion 112*a*. The lens holder mounting portion 114 also includes a window 266 configured to allow light to a lens or lens group. In some implementations, the window 266 includes at least an outer shell 266*a* and an inner shell 266*b*. In further implementations, a lens attached to or part of the window 266 is controlled by an actuator such as a VCM actuator or a ball-bearing focusing actuator. In still further implementations, the window 266 may operate in an open state, a closed state, or a partially-open state based on instructions from the controller 107. Depending on the implementation, the window 266 may be part of a rolling shutter lens barcode reader as described below with regard to FIG. 7.

The chassis 150 may be constructed from a rigid material such as a metal or metal alloy (e.g., zinc). The chassis 150 includes a body 151 that defines any number of cavities 152 in which components may be partially or fully disposed. For example, the aiming module 170 and/or the illumination module 180 may be at least partially disposed within the cavity 152 of the chassis 150. The aiming module 170 may include components to generate a pattern or similar visual indication such as an aiming dot to assist with identifying where the imaging system 110 is aiming. In some examples, the aiming module 170 may include laser and/or light emitting diode ("LED") based illumination sources. The illumination module 180 assists with illuminating the desired target for the imaging system 110 to accurately capture the desired image. The illumination module 180 may include an LED or an arrangement of LEDs, lenses, and the like. The aiming module 170 and the illumination module 180 are described in more detail with regard to FIGS. 6 and 8 below.

The body 151 of the chassis 150 may include a recessed portion 153 that is adapted to receive a portion of the first flex tail connector 105 (e.g., a sub-board or an interconnect member). The chassis 150 further includes a chassis mounting portion 154 disposed or positioned on an outer periphery of the body 151 of the cavity 150. The chassis mounting portion 154 further includes any number of upper hooks 156 and any number of lower hooks 160.

Figure 4:
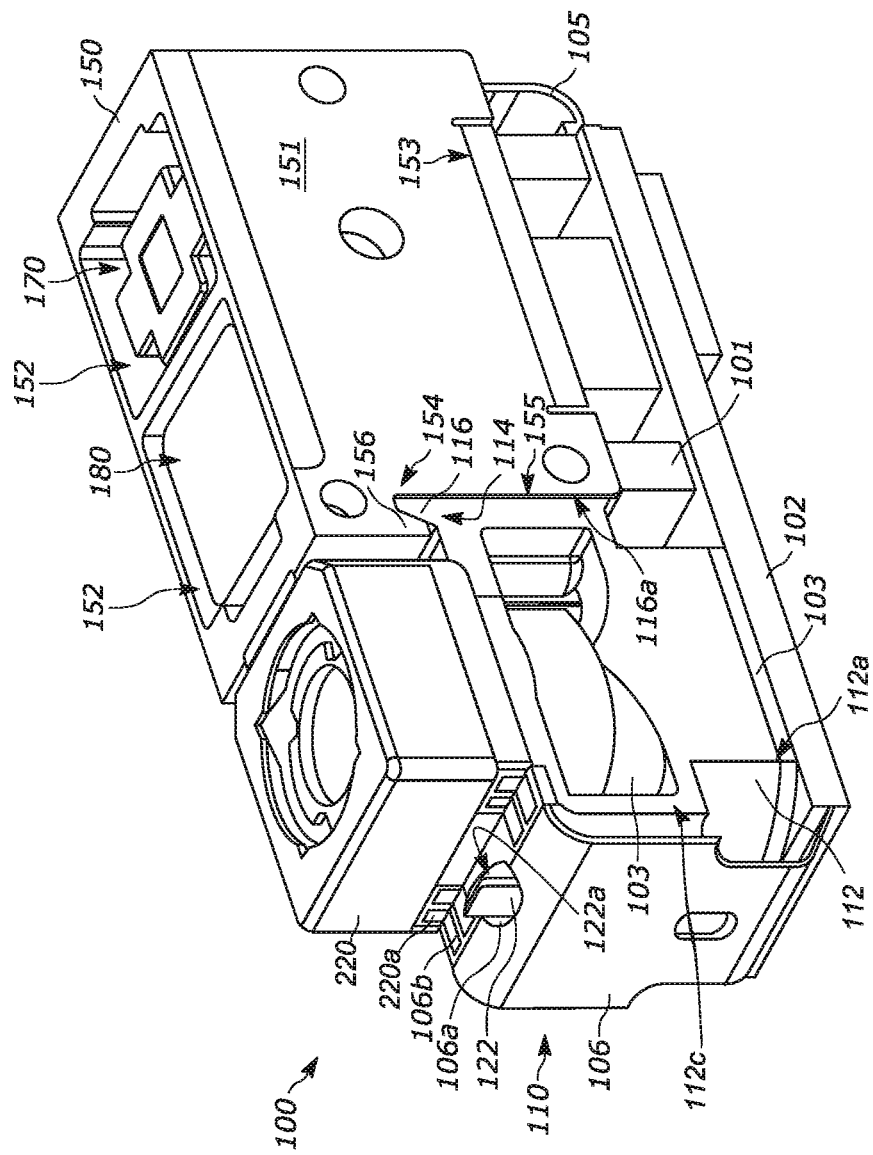
FIG. 4 illustrates a perspective view of an example scanner containing the example imaging assembly of FIGS. 2 and 3 in accordance with various embodiments.

With reference to FIG. 4, the second flex tail connector 106 includes a mounting opening 106a and a number of interconnects 106b. The rear lens holder 112 includes a flex securing tab 122 that protrudes upwardly from the rear lens holder 112. The flex securing tab 122 includes an angled engaging surface 122a which is angled in a direction towards the autofocus module 220. When electrically coupling the autofocus module 220 with the circuit board, the second flex tail connector 106 is urged upward, and the mounting opening 106a is aligned with the flex securing tab 122. Because the engaging surface 122a of the flex securing tab 122 is angled towards the autofocus module 220, the interconnects 106b are moved or positioned against corresponding interconnects 220a positioned on the autofocus module 220, thereby communicatively coupling the autofocus module 220 with the circuit board 102. In some examples, the flex securing tab 122 may include a notch or other feature used to retain the second flex tail connector 106.

Figure 5:
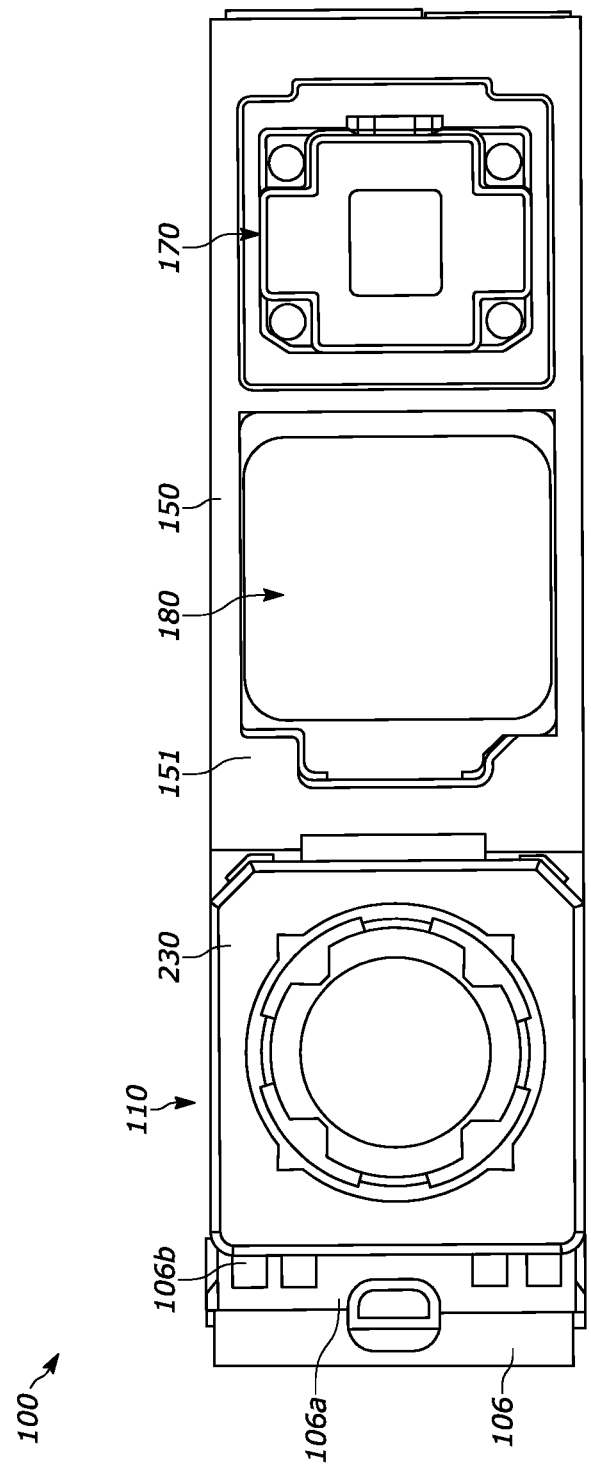
FIG. 5 illustrates a top plan view of the example scanner of FIGS. 1-4 in accordance with various embodiments.

So configured, and as illustrated in FIGS. 4 and 5, the imaging system 110 described herein may occupy an entire available height between the opposing large flat mounting surfaces of the chassis 150 as compared with being constrained by the body 151 of the chassis 150. Further, instead of the chassis 150 being mounted directly to the circuit board 102, the imaging system 110 is mounted to the circuit board 102 while the chassis 150 is coupled with the imaging system 110. Advantageously, such an arrangement isolates heat of the aiming module 170 and the illumination module 180 disposed within the chassis 150 from the optical sensor mounted on the circuit board 102, while also providing for additional optical path length for the imaging system 110.

Figure 6:
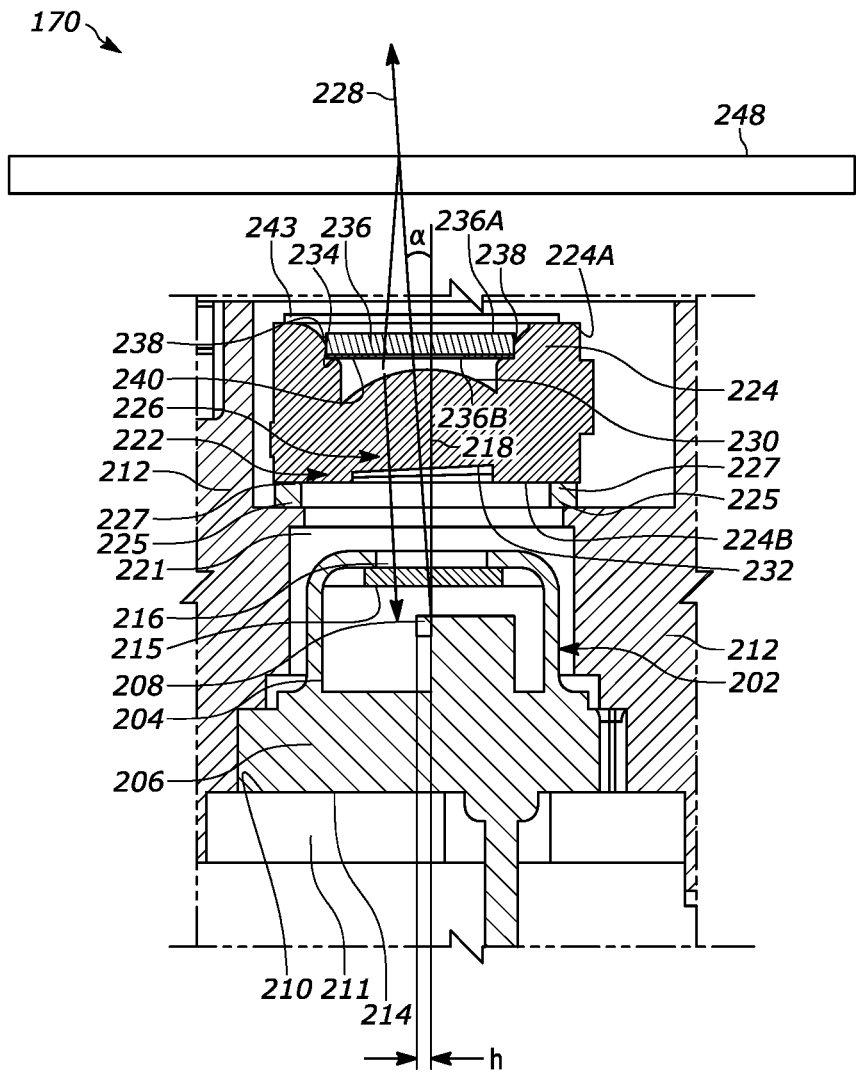
FIG. 6 illustrates a cross-sectional view of an example aiming module incorporated into the imaging assembly of FIGS. 1-5 in accordance with various embodiments.

FIG. 6 illustrates an example implementation of the aiming module 170. The aiming module 170 is configured to generate an aim light pattern to serve as a visual guide for users during operation of the imaging engine device 100, in particular for accurate positioning of the imaging system 110 and the illumination module 180. In some implementations, the aim light pattern is an aiming beam. Whereas conventional aiming assemblies are able to generate bright, central aiming dots or patterns, they typically do so on an axis offset from that of the illumination module field of view and imaging system field of view. And for configurations where aiming assemblies are designed to tilt the axis of an aiming beam, the configurations are too large, requiring wedges or similar optics, to be compatible with integrated scanner assemblies, such as those described herein. In contrast, in various examples, aiming modules provide small stack height designs capable of generating aiming dot or aim light pattern axis tilt without increasing overall height of an integrated scanner assembly.

In the example of FIG. 6, aiming module 170 includes a beam source assembly 202 which has a frame 204 having a mounting plate 206 onto which a beam source 208 is positioned. The beam source 208 may be a laser or LED based beam source. In some examples, the beam source 208 is a vertical emitting beam source, such as a vertical cavity surface emitting laser. In some examples, the beam source 208 is a side emitting beam source or edge emitting beam source. Depending on the implementation, the aiming module 170 may direct the beam source 208 to generate the aim light pattern and/or beam in a pulsed laser driving mode with a set or variable frequency. In some implementations, the pulsed laser driver mode pulses the laser at a frequency of 20 Hz, 40 Hz, 60 Hz, 80 Hz, or 100 Hz.

In further implementations, the aim light pattern may be red (e.g., the aim light pattern has a wavelength of 630 nanometers to 670 nanometers) or green (e.g., the aim light pattern has a wavelength of 505 to 535 nanometers). Depending on the implementation, the aim light pattern may be limited to an average power of less than or equal to 1 milliwatt but is visible in sunlight at a distance of at least 40 inches.

The frame 204 may be an integrated piece having a mounting surface 210 mountable to a mounting surface 214 of a mounting plate 211, which may be formed with or attached to a chassis 212 to serve as a chassis mounting portion. In other examples, the frame 204 may be mounted (e.g., glued onto or pressed into) directly on the chassis 212, without a mounting plate 211. For example, walls of the lower cavity 221 may be sized to receive the mounting plate 206 of the frame 204 and fixedly retain the later in place. In some examples, the mounting plate 211 and/or the mounting plate 206 may provide a heat dissipation function for the laser 208.

The frame 204 includes a transparent window 215 environmentally sealing the laser 208 and positioned adjacent an opening 216 that functions as an aperture through which the generated aim light pattern is provided along a beam axis 218. The frame 204 sits within a lower cavity 221 of the chassis 212. In some examples, the lower cavity 221 may be environmentally sealed using a transparent window at an upper end (not shown). The chassis 212 further includes an outer cavity 223 having chassis mounting portions (surfaces) 225 onto which the collimator assembly 222 may be placed during assembly and held in place by an adhesive, such as a UV curable adhesive 227 surrounding a lower outer edge of the assembly 222. Further a transparent window 248 may be mounted to an exit end of the chassis 212, above the collimator assembly, for transmission of the aiming pattern along a tilt axis as described below.

The collimator assembly 222 is a low profile assembly having a body 224 that has an outer surface 224A and an inner surface 224B parallel thereto. The collimator assembly further includes a lens group 226 that is positioned between the outer surface 224A and the inner surface 224B. More particularly, the lens group 226 defines a tilt axis 228. In the illustrated example, that tilt axis 228 forms an acute angle relative the parallel outer and inner surfaces 224A, 224B. Further, the tilt axis 228 defines a tilt angle, $\alpha$, relative to the beam axis 218, which may also be considered a central axis. Further still, the lens group 226 is positioned relative to the beam source 208 such that aim light pattern and/or beam, incident along the beam axis 218, is deflected onto the tilt axis 228 by the lens group 226. In various examples, the tilt angle, $\alpha$, is confined by the expression as $\alpha > 0.5*\mathrm{atan}(h/F)$, where F is a focal length of the lens group 226 and h is a clearance height of the beam source 208, so as to prevent back reflection of the aim light pattern and/or beam from an exit window back on to the beam source 208.

In various examples, the lens group 226 includes a first lens 230 at an exit end and a second lens 232 at an entrance end. Both of the lens 230 and 232 may be tilted, meaning having a central shared axis that is tilted related to the beam axis 218. In some examples, one or both of first lens 230 and second lens 232 is a semispherical lens, meaning a lens whose surface profile has at least a portion thereof formed of a sphere or cylinder. In some examples, one or both of the first lens 230 and the second lens 232 is an aspheric lens, meaning a lens whose surface profiles are not portions of a sphere or cylinder. In some examples, the lens group 226 may be formed of a double convex lens having a central axis tilted to be parallel with the axis 228. In some examples, the lens group 226 may be formed of a lens having symmetric aspheric surfaces, where the first lens 230 and the second lens 232 have aspheric curvatures. In other examples, the second lens 232 is implemented as a generally planar surface instead, e.g., a tilted planar face. In various examples, the lens group 226 is integrally formed from the body 224 such that it a continuous piece.

As shown in FIG. 6, in various examples, the optical element 236 is a diffractive optical element and may have a planar outer surface 236A and a diffractive element at an inner surface 2366, the latter being positioned to receive the input beam from the lens group 226. The sealing adhesive 238, therefore, not only retains the optical element 236 in the recess 234, but further provides environmental sealing that prevents contamination of the diffractive element located at the inner surface 236B. In other examples, the optical element 236 may be a refractive optical element or a combination of diffractive and refractive elements. The optical element 236 is configured to convert the input beam into an aiming pattern that appears at a focal distance of the lens group 226. This configuration provides a compact design while still allowing for converting an input beam into a complex beam or aim light pattern at the far field, where such patterns can be geometric shapes, such as squares, rectangles, circles, etc. But also more complex shapes such as logos, text, pictures, etc. The optical element 236, as part of the lens group 226, may further cooperate with the aspheric surface 230 to collimate the incident input beam along with tilting the propagation axis of the beam. An optical element retainer 243, also termed an eye-safety retainer, is affixed to the upper surface 224A, e.g., using an adhesive, to provide further protection against dislodging of the optical element 236 from the aiming module 170. The retainer 243 may include an aperture positioned and sized to allow transmission of the deflected aiming beam or aim light pattern, where the remainder of the retainer 243 may be non-transparent. The retainer 243, for example, may be formed with a black material or other opaque medium or even a partially transmitting medium such as a diffuser. The retainer 243, therefore, allows the deflected aim light pattern through its aperture but otherwise blocks or minimizes back reflections and stray light from entering the lower cavity 221 and impinging on the laser 208. As such, the retainer 243 prevents stray light from causing spurious reflections and brightness flares. The retainer 243 additionally prevents the optical element 236 from being in the path of the deflected aiming beam or aim light pattern, in the event the adhesive 238 fails. In some examples, the optical element retainer 243 further includes sensing electrodes positioned thereon to allow an external circuit to determine if the window itself has been dislodged (e.g., in response to a received signal, a change in measured impedance, or other electrical detection) providing a warning signal to an operator.

In various examples, a beam forming aperture 240 is placed first in the recess 234 to provide shielding of the lens group 222 against extraneous off axis back scattering light, ambient light, or other illumination. The optical element 236 may then be placed on top of that aperture 240.

Figure 7:
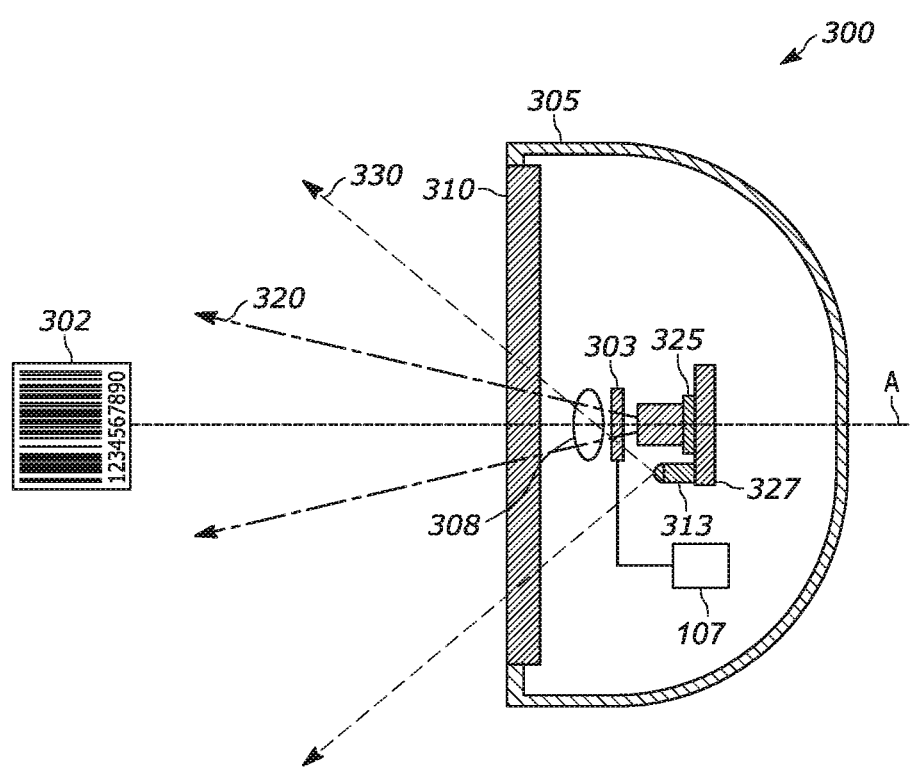
FIG. 7 illustrates a cross-sectional view of an example imaging system implemented as a rolling shutter lens scanner and incorporated into the scanner of FIGS. 1-5 in accordance with various embodiments.

Referring to FIG. 7, an example rolling shutter sensor system 300 is shown that uses an obfuscative element or obfuscator 303 to operate as a rolling shutter sensor system 300 for imaging an object of interest 302. The obfuscator 303 is disposed inside of a housing 305 along an optical path A of field of view 320 of an imaging sensor 325. Depending on the implementation, the obfuscator 303 may be a physical external optical or mechanical shutter. In such implementations, the obfuscator 303 enhances the performance of the rolling shutter sensor system 300. In further implementations, the obfuscator 303 is part of the imaging sensor 325 and allows the rolling shutter sensor system 300 to function as a rolling shutter sensor system 300. In other implementations, the obfuscator 303 is not present and the rolling shutter sensor system 300 operates using electronic means instead (e.g., by filtering out light received by the imaging sensor).

In some implementations, the housing 305 is contained within and/or part of rear lens holder 112. In further implementations, the housing is a separate part of the chassis 150. Similarly, depending on the implementation, the imaging sensor 325 is or includes the sensor of the imaging assembly 110. A controller 107 controls a state of the obfuscator between an obfuscative state and a transmissive state. The obfuscative state is an optical state in which the obfuscator obfuscates or obscures a majority of radiation to the imaging sensor 325 along the optical axis A, and the transmissive state is an optical state in which the obfuscator transmits a majority of radiation to the imaging sensor 325 along the optical axis A. In implementations in which the imaging sensor 325 is a rolling shutter sensor, the obfuscator may move to allow some radiation to the imaging sensor 325 in smaller subsets—i.e., the imaging sensor 325 receives light in a rolling pattern. In further implementations, the imaging sensor 325 may be disposed and/or configured to receive light in a rolling pattern without the obfuscator 303.

The imaging sensor 325 is mounted on an imaging circuit board such as circuit board 327, which may provide power to the imaging sensor 325, control of operation of the sensor 325, on/off board communications of data to and from the imaging sensor 325, among other operations and purposes. In some implementations, the imaging circuit board 327 is part of or is circuit board 102. The imaging sensor 325 may be a CMOS device, or other imaging sensor capable of functionality as a rolling shutter sensor. In some implementations, the imaging sensor 325 is the optical sensor on the circuit board 102 and/or is part of imaging system 110. The imaging sensor 325 may have a fixed exposure time, or the exposure time and rolling shutter functionality may be tuned to change the exposure time based on an object of interest, a distance of the object of interest, an illumination of the object of interest, etc. For example, in some implementations, the imaging sensor 325 exposure time and rolling shutter functionality may be tuned to operate in varying modes depending on the speed of a target (e.g., low-speed, high-speed, and very high-speed modes). In a particular preferred embodiment, the imaging sensor has a pixel size of at most 2.0 micrometers.

A lens 308 is disposed along the optical path A to focus images received by the rolling shutter sensor system 300 onto an imaging plane at the imaging sensor 325. A window 310 is disposed along the optical axis A to provide a transmissive surface for optical radiation to pass along the optical axis into the housing 305. In some implementations, the window 310 is the window 266 discussed with regard to FIG. 3 above. The window 310 acts as an aperture and may be useful for preventing stray light and optical noise from entering the housing 305. Further, the window may be a material or have coatings to perform as a filter to reduce noise or to select wavelengths of light for imaging at the imaging sensor 325. Each of the window 310, lens 308, and obfuscator 303 are disposed to image the object of interest 302 onto the imaging sensor 325.

While not illustrated, a person of ordinary skill in the art would recognize that additional or fewer optical elements may be implemented along the optical axis for imaging of the object of interest. For example, one or more additional lenses, wavelength filters, spatial filters, polarizers, beam splitters, mirrors, waveplates, apertures, or other optical elements may be employed for imaging of the object of interest 302. In a configuration, the object of interest 302 includes one or more indicia indicative of information about the object of interest, the indicia being one or more of a 1D or 2D barcode, QR code, dynamic QR code, UPC code, serial number, alphanumeric, a graphic, or another indicia.

The obfuscator 303 may be a transflective mirror, positioned within the housing 305 along the optical path A. As a transflective mirror, the obfuscator 303 can be switched between a transmissive state, in which a majority of light is allowed to pass through the transflective mirror, and a reflective state, in which a majority of light is reflected off of the transflective mirror. For example, the obfuscator 303 may switch states in response to an electrical control signal received from the controller 107. With the transflective mirror in the reflective state, the transflective mirror reflects at least a first portion of radiation in the field-of-view 320 of the imaging sensor 325. In the transmissive state, the transflective mirror allows for optical radiation within the field-of-view 320 to pass through the transflective mirror 355 along the optical path A to the imaging sensor 325. Optionally, the transflective mirror could also be switched to a partially reflective state, in which the transflective mirror would both reflect a portion of light, and transmit a portion of light. Such an example may be useful in a system that images the object of interest 302 while targeting radiation is provided to the barcode or object of interest. For example, the rolling shutter sensor system 300 may further include a target radiation source 313 that provides radiation 330 to the object of interest 302 for a user of the barcode reader to reference when positioning the object of interest for scanning, or when position the rolling shutter sensor system 300 in the case of a handheld barcode reader.

While described above as a transflective device, the obfuscator 303 does not need to reflect optical radiation. In the obfuscative state, the obfuscator 303 may absorb the radiation, or otherwise obscure the optical radiation to prevent the radiation from reaching the imaging sensor 325, while the obfuscator 303 passes radiation to the imaging sensor 325 when in the transmissive state. In configurations, the obfuscator 303 may include one or more of a transflective mirror, a different transflective element, an electrochromic device, a polymer-dispersed liquid crystal film, or another electrically controllable shutter element (e.g., an external shutter) capable of transitioning between states at a time scale operational for a rolling shutter sensor system 300.

Further, while FIG. 7 illustrates an imaging engine 100 with a rolling shutter sensor system 300 using an example rolling-shutter sensor, imaging engine 100 and/or rolling shutter sensor system 300 may include any similar such sensor. For example, a global shutter sensor—i.e., a sensor in which all pixels of an array are exposed simultaneously rather than individual subsets of pixels being exposed at different times—may be used. Similarly, a lens or sensor system capable of operating in both a rolling-shutter or global shutter mode may also be used.

Figure 8:
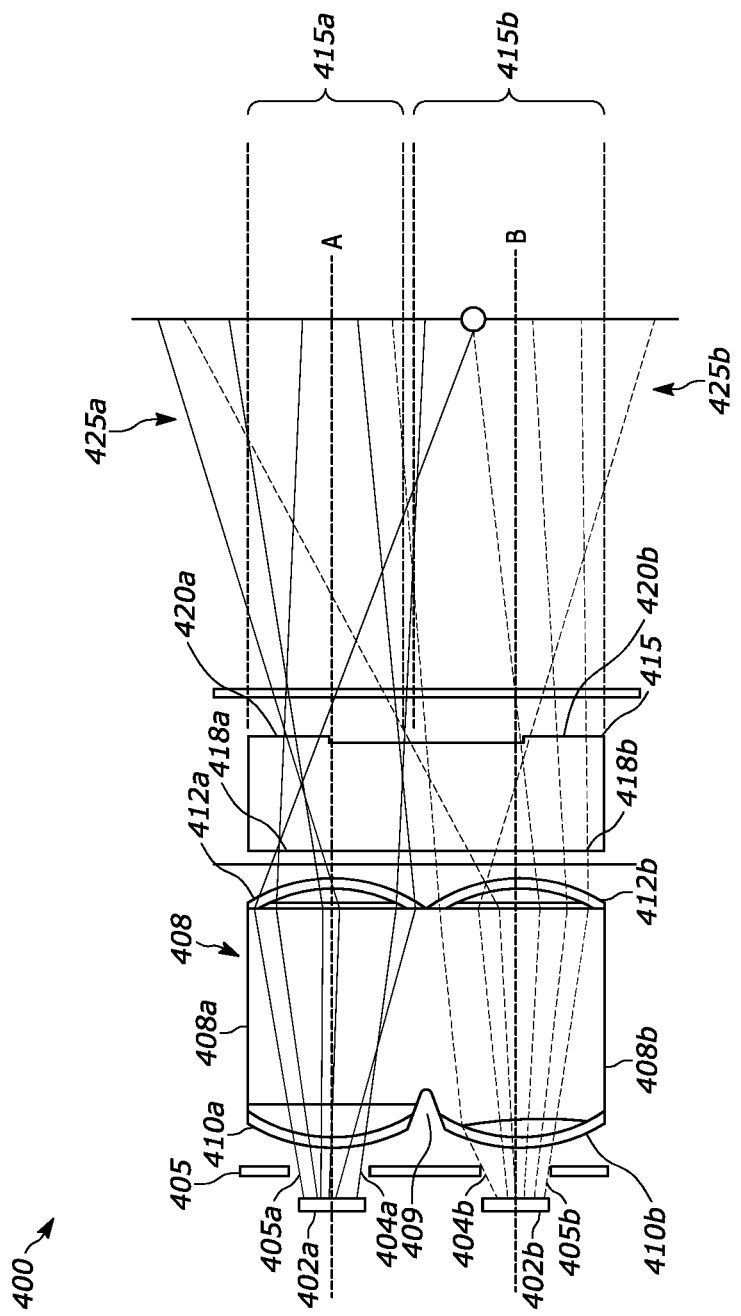
FIG. 8 illustrates a cross-sectional view of an example illumination module incorporated into the scanner of FIGS. 1-5 in accordance with various embodiments.

Next, FIG. 8 illustrates a cross-sectional side view of a ray trace of an embodiment of an optical assembly 400 of a dual illumination module 180. The optical assembly 400 includes a first illumination source 402a and a second illumination source 402b. The first illumination source 402a is disposed along a first optical axis, A, to provide first illumination 404a along the first optical axis, A. The second illumination source 402b is disposed along a second optical axis, B, configured to provide second illumination 404b along the second optical axis, B. In some implementations, the first and second illumination sources 402a and 402b may include one or more LEDs, laser diodes, lasers, black body radiation sources, or other such illumination sources. In embodiments, the first and second illumination 404a and 404b may include one or more of infrared radiation, near-infrared radiation, visible light, optical radiation, ultraviolet radiation, or another type of radiation for illumination of a target for imaging of the target.

The first and second illumination sources 402a and 402b may be square light sources and center points of the first and second illumination sources 402a and 402b may be disposed between 1 and 5 millimeters apart, between 5 and 10 millimeters apart, less than 10 millimeters apart, or greater than 1 centimeter apart. Further, the first and second illumination sources 402a and 402b may be 1 millimeter by 1 millimeter squares, 2 millimeters by 2 millimeters squares, 5 millimeters by 5 millimeters squares, or larger than 5 millimeters by 5 millimeters squares. In a particular implementation, the first and second illumination sources 402a and 402b are 1 millimeter by 1 millimeter square white LED lights. Depending on the implementation, the first and second illumination sources 402a and 402b may have sufficient luminance to allow for barcode reading at a distance of up to 170 inches in ambient darkness, and/or greater distances in at least low levels of ambient light (e.g., 5-10 foot-candles). Similarly, depending on the implementation, the first and second illumination sources 402a and 402b output illumination fields 425a and 425b in rectangular shapes, cone shapes, or any other suitable design.

The first and second illumination sources 402a and 402b may also be circular, rectangular, or another geometric shape. The optical assembly includes an aperture element 405 having a first aperture 405a and a second aperture 405b. The first illumination 404a propagates along the first optical axis A through the first aperture 405a, and the second illumination 404b propagates along the second optical axis B through the second aperture 405b. Depending on the implementation, the optical axis A may or may not be the same optical axis A referred to in FIG. 7. The first and second apertures 405a and 405b may be independent apertures, or they may be two apertures of a same larger aperture element, such as two holes or openings in a single material with the two holes being independent and spatially separated by some distance. Further, the first and second apertures 405a and 405b may be a same large aperture that transmits both the first and second illumination 404a and 404b.

A collimator element 408 is disposed along the first and second optical axes A and B to collimate the first and second illumination 404a and 404b. The collimator element 408 has a first collimator 408a and a second collimator 408b. The first collimator 408a has a first collimator entry surface 410a configured to receive the first illumination 404a from the first aperture 405a, and the second collimator 408b has a second collimator entry surface 410b configured to receive the second illumination 404b from the second aperture 405b. The first and second collimator entry surfaces 410a and 410b may be separated by a separator element 409 that prevents at least some of the first illumination 404a from entering the second collimator 408b, and further prevents at least some of the second illumination 404b from entering the first collimator 408a. The separator element 409 may include a wedge or wall of air, metal, plastic, glass, or another material. The first collimator 408a has a first collimator exit surface 412a disposed along the first optical axis A to provide collimated first illumination 404a to a microlens array element 415. The second collimator 408b has a second collimator exit surface 412b disposed along the second optical axis B to provide collimated second illumination 404b to the microlens array element 415.

The microlens array element 415 is disposed along the first and second optical axes, A and B respectively, to receive the collimated first and second illumination 404a and 404b from the collimator element 408. The microlens array element 415 has a first microlens array 415a and a second microlens array 415b. The first microlens array 415a has a first microlens entry surface 418a disposed along the first optical axis A to receive the first illumination 404a. The first microlens array 415a also has a first microlens exit surface 420a to provide the first illumination 404a as a first output illumination field 425a, illustrated by solid lines in FIG. 8, to a target for imaging of the target. The second microlens array 415b has a second microlens entry surface 418b disposed along the second optical axis B to receive the second illumination 404b. The second microlens array 415b also has a second microlens exit surface 420b to provide the second illumination 404b as a second output illumination field 425b, illustrated as broken lines in FIG. 8, to a target for imaging of the target. In some implementations, each of the first output illumination field 425a and second output illumination field 425b correspond with an operation mode of illumination module 180 as described with regard to FIG. 10 below. For example, the first output illumination field 425a may illuminate a near FOV portion of the overall FOV while the second output illumination field 425b illuminates a far FOV portion.

Each of the first and second microlens arrays 415a and 415b may each independently spread input radiation or stretch an input radiation field to provide an output illumination field with one or more dimensions having a wider field angle than input collimated illumination. The microlens array element 415 may be a plastic material such as Zeonex, Acrylic Polycarbonate, K26R, E48R, or another such material. In some implementations, the microlens array element 415 may be a glass material or other optical material able to transmit light. Further, the distance between either of the first and/or second illumination sources 402a and 402b to the second surface of either of the first and/or second microlens exit surfaces 420a and 420b may be 5 millimeters, 7 millimeters, 10 millimeters, 12 millimeters, less than millimeters, less than 10 millimeters, or less than 8 millimeters to provide a compact form factor for the optical assembly 400.

Figure 9:
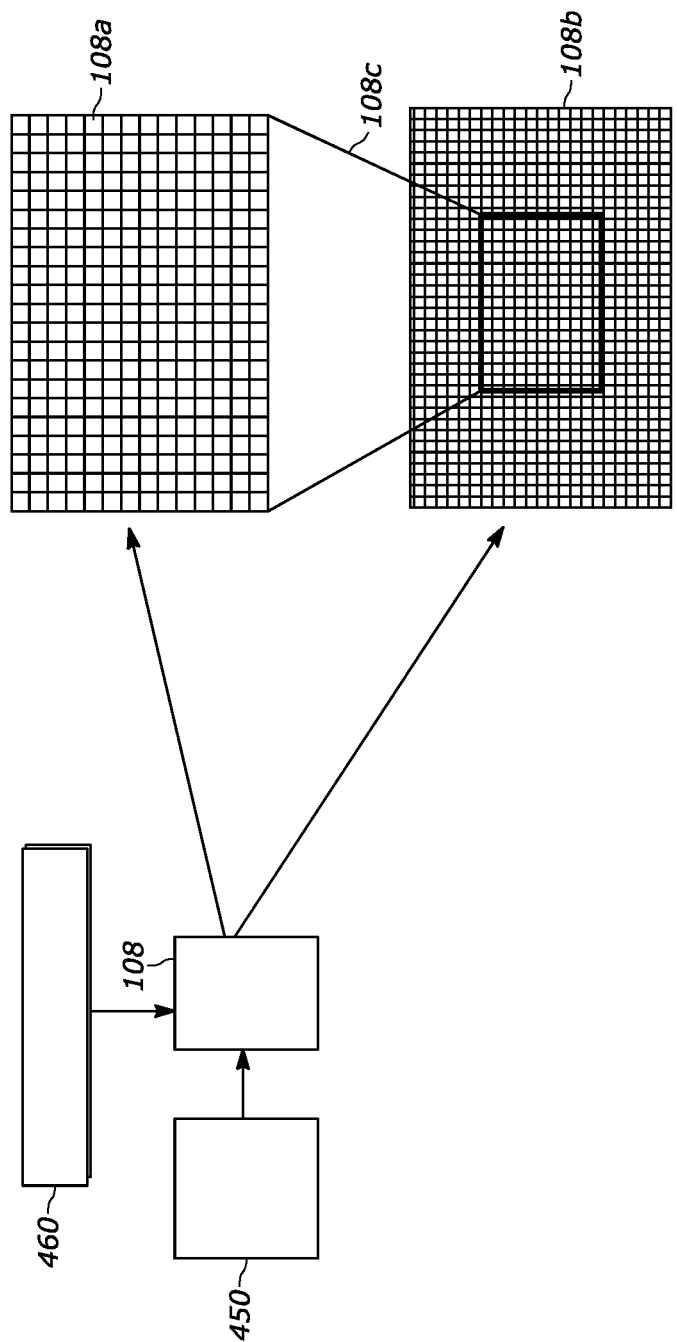
FIG. 9 illustrates a block diagram of an example digital zoom module incorporated into the imaging assembly of FIGS. 1-5 in accordance with various embodiments.

FIG. 9 illustrates an example schematic block diagram of the digital zoom module 108. As is noted above, depending on the implementation, the digital zoom module 108 may be implemented in a separate piece of hardware than controller 107 or may be a software module implemented on the controller 107. The digital zoom module 108 receives an image 450 taken by the imaging system 110 or otherwise received by the controller 107. The image may have a resolution of 1 megapixel, 2 megapixels, 4 megapixels, 6 megapixels, 8 megapixels, or any other suitable resolution for imaging. In a particular preferred embodiment, the image has a resolution of at least 3 megapixels. The digital zoom module 108 also receives a target distance 460. Depending on the implementation, the controller 107 may calculate or otherwise determine the target distance 460 using methods outlined above and subsequently analyze the target distance 460 using the digital zoom module 108. In other implementations, the digital zoom module 108 may receive the target distance 460 from the controller 107 or from another piece of hardware in the digital imaging engine 100. Depending on the target distance 460, the digital zoom module begins operation in an operation mode. In some implementations, the digital zoom module 108 may operate in multiple operation modes and the controller 107 determines which operation mode the digital zoom module 108 is to operate in. In further implementations, the digital zoom module 108 may operate in one of three operation modes: a binning mode 108a, a cropping mode 108b, and an interleaving mode 108c. In the binning mode 108a, the digital zoom module 108 takes individual pixels and combines the pixels into larger pixels (i.e., super-pixels). In some implementations, the digital zoom module 108 may bin the pixels into super-pixels with a size of 2×2 pixels, 3×3 pixels, or other suitable super-pixel sizes. In the cropping mode 108b, the digital zoom module 108 crops a portion of the overall image, such as a quarter, a third, half, or other suitable cropping sizes. In the interleaving mode 108c, the digital zoom module 108 combines the techniques of the binning mode 108a and the cropping mode 108c. Depending on the implementation, the digital zoom module 108 may determine the appropriate binning, cropping, or interleaving based on the input image 450 resolution and a desired output image resolution. The output image resolution may be based on an appropriate resolution for barcode decoding. As such, the output image resolution may be 0.25 megapixels, 0.5 megapixels, 1 megapixel, 2 megapixels, 3 megapixels, 4 megapixels, or any other suitable image for barcode decoding. In a particular preferred embodiment, the output image resolution is between 0.5 megapixels and 2 megapixels.

Figure 10:
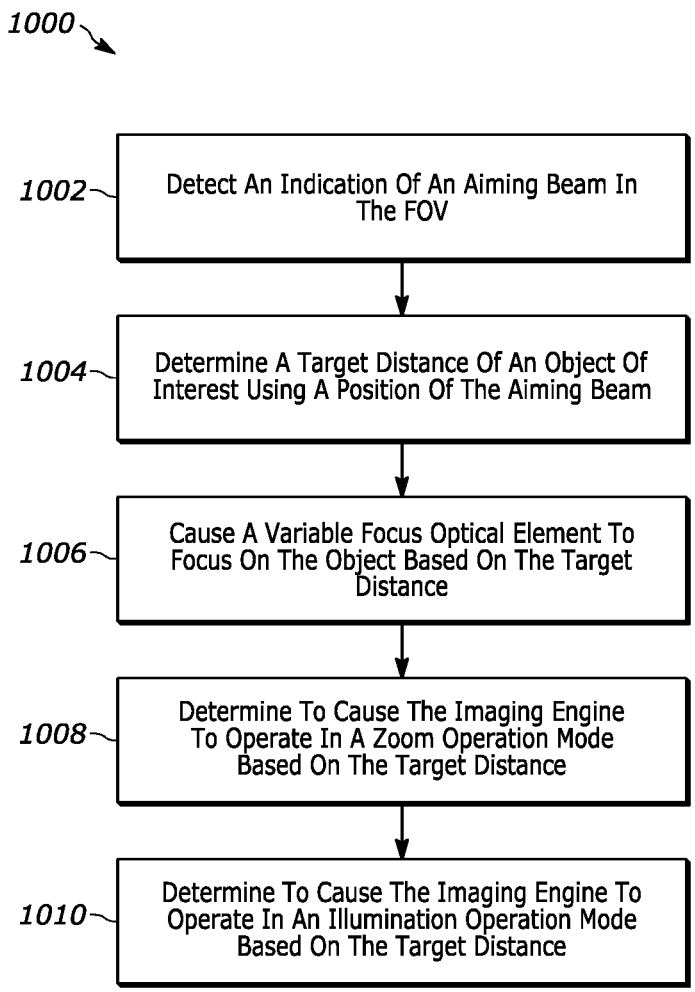
FIG. 10 is an example flow diagram of a method for configuring and controlling various modules of the scanner of FIGS. 1-5 in accordance with various embodiments.

Referring next to FIG. 10, a flowchart 1000 illustrates a method for controlling object imaging and range finding by controller 107, which controls each of the autofocus module 220, aiming module 170, and illumination module 180. For the sake of clarity, FIG. 10 is discussed with regard to the controller 107, autofocus module 220, aiming module 170, and illumination module 180. However, any similarly suitable controller, autofocus module, aiming module, and illumination module may be used.

At block 1002, the imaging engine device 100 detects a presence of an aim light pattern in the FOV. In some implementations, the imaging engine device 100 detects the presence through communication between the controller 107 and the aiming module 170. In further implementations, the controller 107 receives an indication of the presence from the imaging system 110. Depending on the implementation, the imaging engine device 100 detects a presence of an aim light pattern (e.g., an aiming dot and/or a visual indication of a beam) emitted from the imaging engine device 100 and controlled by the aiming module 170. After detecting the presence of the aim light pattern, the flow proceeds to block 1004. At block 1004, the controller 107 determines a parallax target distance of an object of interest using the position of the aim light pattern. In some implementations, the controller 107 determines the target distance based on the size of the aim light pattern in the FOV. In other implementations, the controller 107 determines the target distance based on how bright the aim light pattern is. In still other implementations, the aim light pattern is a complex pattern on the target and the controller 107 determines the target distance based on the pattern. For example, the pattern may be a series of vertical lines that the controller 107 determines the target distance on using apparent distance between lines.

Depending on the implementation, the imaging engine device 100 may include or be communicatively coupled to a screen, such as mobile device screen, computer screen, or screen included as part of the housing of the imaging engine. In some such implementations, the controller 107 causes the screen to display the determined target distance to a user. As such, the imaging engine device 100 may function as a range finder. In some implementations, the controller 107 only causes the screen to display the determined target distance when a range finding mode is enabled by the user. In further implementations, the controller 107 may cause the assembly to emit an audio cue in addition to or in place of causing the screen to display the determined target distance. For example, the imaging engine device 100 may read the target distance aloud for the user or may emit different noises to indicate different ranges (i.e., for 0-5 inches, 5-20 inches, 20-50 inches, etc.).

Next, at block 1006, the controller 107 causes a lens assembly of the imaging system 110 to focus a variable focus optical element on the object of interest. In some implementations in which the imaging system 110 includes a ball-bearing motor lens, the controller 107 sends an indication to the ball-bearing motor lens to focus on the object based on the target distance. Depending on the implementation, block 1006 may occur before, after, or substantially simultaneously with part of block 1004.

At block 1008, the controller 107 causes a digital zoom module 108 and/or the imaging system 110 of the imaging engine 100 to select and operate in a zoom operation mode based on the target distance. The selection and operation may be based on a determination by the controller 107 to begin or change zoom mode operation. In some implementations, the image taken by the imaging system 110 has a resolution greater than the preferred resolution for barcode decoding. For example, the image taken by the imaging system may have a resolution of 4 megapixels while a preferred resolution for barcode decoding is 1 megapixel. The zoom operation mode may be one mode out of multiple different zoom modes. In some implementations, the zoom operation modes include at least a Near FOV mode, a Far FOV mode, and an interleaved mode. Depending on the implementation, the zoom operation modes may correspond with the level of digital zoom. For example, the imaging system 110 may be fully zoomed out (i.e., no zoom) when operating in the Near FOV mode and may be fully zoomed in (i.e., zoomed in 2-3 times) when operating in the Far FOV mode.

While operating in the Near FOV mode, the controller 107 or the imaging engine 100 may operate by binning pixels in images taken by the imaging system 110. In some implementations, the imaging engine 100 performs 2×2 binning, i.e., combining pixels in a 2 pixel by 2 pixel square into a single super-pixel. The imaging engine 100 may perform 3×3 binning, 4×4 binning, or any other suitable binning. In other implementations, the imaging engine 100 performs binning proportional to the factor of difference between the image reading resolution and the barcode decoding resolution (i.e., 2×2 binning is preferred for a resolution difference of 4 megapixels vs. 1 megapixel).

While operating in the Far FOV mode, the controller 107 or the imaging engine 100 may operate by cropping a portion of the image. In some implementations, the imaging engine 100 crops a smaller portion of the image depending on the distance of the object, up to one quarter of the total area of the image. In further implementations, similar to binning in the Near FOV mode, the imaging engine 100 performs cropping proportional to the factor of difference between the image reading resolution and the barcode decoding resolution (i.e., a minimum cropping size of one quarter is preferred for a resolution difference of 4 megapixels vs. 1 megapixel).

While operating in the interleaved mode, the controller 107 or the imaging engine 100 may operate by interleaving cropping a portion of the image and binning pixels as described above. In some implementations, the imaging engine 100 may crop up to a quarter of the image and may bin pixels up to a 2×2 binning process, depending on the resolution of images taken by the imaging system 110 and the preferred resolution for barcode decoding. Depending on the implementation, the cropping and the binning may be performed alternatively, simultaneously, or one after another.

The controller 107 determines what operation mode the imaging engine 100 is to operate in based on the determined target distance of the object of interest. In some implementations, the controller 107 compares the determined target distance of the object to one or more threshold values in determining which zoom operation mode a zoom module 108 and/or imaging system 110 of the imaging engine 100 is to operate in. For example, the controller 107 may cause the imaging engine 100 to operate in the Near FOV mode when the target distance is below a first threshold value, the Far FOV mode when the target distance is above a second threshold value, and the interleaved mode when the target distance is between the two threshold values. In some such implementations, the imaging engine operates in the Near FOV mode when the target distance is less than or equal to 8 inches, the Far FOV mode when the target distance is greater than or equal to 40 inches, and the interleaved mode when the target distance is between 8 and 40 inches, non-inclusive.

Similarly, at block 1010, the controller 107 causes the imaging engine 100 to select and operate in an illumination operation mode based on the target distance. The illumination operation mode may be one mode out of multiple different illumination modes. In some implementations, the illumination operation modes include at least a Reduced Power mode, a Near Illumination mode, and a Far Illumination mode. In some such implementations, the illumination module 180 alternates between two illumination fields depending on the illumination operation mode. For example, the illumination module 180 may provide a first illumination field when operating in either of the Reduced Power or Near Illumination modes and may provide a second illumination field when operating in the Far Illumination mode. Similarly, the illumination module 180 may instead provide a first illumination field when operating in the Near Illumination mode and a second illumination field when operating in the Reduced Power or Far Illumination modes.

The controller 107 determines what operation mode the imaging engine 100 is to operate in based on the determined target distance of the object of interest. In some implementations, the controller 107 compares the determined target distance of the object to one or more threshold values in determining which illumination operation mode the imaging engine 100 is to operate in. For example, the controller 107 may cause the imaging engine 100 to operate in the Reduced Power mode when the target distance is below a first threshold value, in the Far Illumination mode when the target distance is above a second threshold value, and in the Near Illumination mode when the target distance is between the first and second threshold values. In some such implementations, the imagine engine 100 operates in the Reduced Power mode when the target distance is less than or equal to 24 inches, the Far Illumination mode when the target distance is more than or equal to 40 inches, and the Near Illumination mode when the target distance is between 24 and 40 inches, non-inclusive.

In some implementations, the controller 107 may determine that an object switches between two zoom and/or illumination operation modes. In such implementations, the controller 107 may change the operation mode correspondingly. In some such implementations, rather than immediately switch between illumination modes, the controller 107 instead implements a delay period. As such, when the controller 107 determines that the imaging engine 100 should change illumination operation modes (i.e., determines that the target distance surpasses or falls below a threshold value), the controller 107 waits for a predetermined period before switching modes. Depending on the implementation, the delay period may be 0.1 seconds, 0.5 seconds, 1 second, 5 seconds or any other similarly suitable length of time. In further implementations, the delay period resets each time the controller 107 determines that the imaging engine 100 should change illumination operation modes. For example, a target may be located approximately the threshold distance away between two modes. A user operating the imaging engine may move the reader back and forth, causing the controller 107 to read target distances in both operation mode brackets before settling in one. After the delay period passes fully in the final operation mode bracket, the controller 107 changes the illumination operation mode.

Though blocks 1008 and 1010 are described in one order, each of blocks 1008 and 1010 may occur substantially simultaneously or in any order between themselves. Similarly, in some implementations, blocks 1008 and 1010 may occur substantially simultaneously with, before, or after block 1006.

After determining the operation mode or modes in which the imaging engine device 100 should operate, the controller 107 may cause one or more elements of the imaging engine device 100 to capture an image including the target in the FOV. For example, the controller 107 may cause the aiming module 170 to direct an aim light pattern onto a target before causing the autofocus module 220 to focus on the target. The controller 107 may then cause the illumination module 180 to operate in an illumination mode before causing the digital zoom module 108 and/or the imaging system 110 to zoom on the target and capturing an image. In implementations in which the target is a barcode, QR code, or other similar coded image, then after the imaging engine device 100 captures the image and/or crops an ROI of the image, the controller 107 decodes the target.

Figure 11:
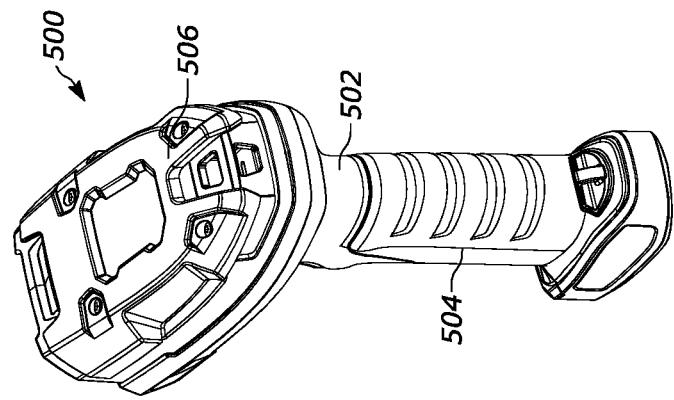
FIG. 11 illustrates a perspective front and back view of an optical imaging reader in accordance with various embodiments.
Figure 11:
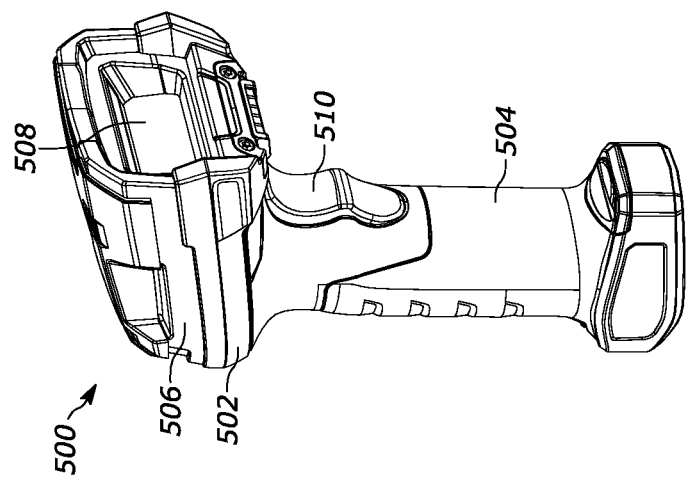
Figure 12:
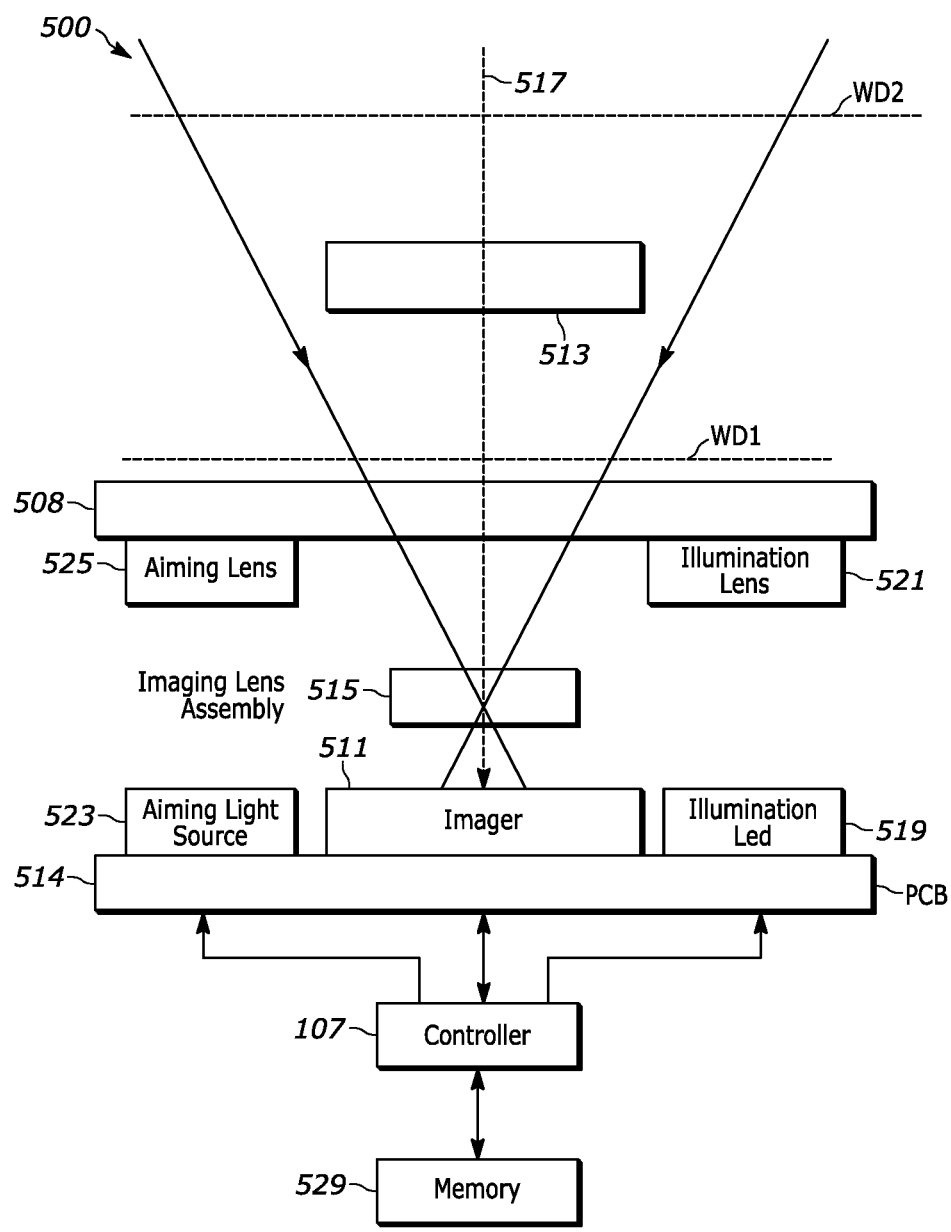
FIG. 12 illustrates a schematic block diagram of various components of the reader of FIG. 1 in accordance with various embodiments.

The above-identified imaging engine device 100 can be implemented in the barcode reader of FIGS. 11 and 12. FIGS. 11 and 12 are exemplary embodiments of an optical imaging reader 500 (also referred to as a barcode reader) and the components thereof. However, it will be understood that the above-identified imaging engine is not exclusively implemented in barcode readers 500, and is instead able to be implemented in any such device employing an image assembly with a field-of-view (FOV). With more specific reference to barcode readers, it will be further understood that, although a particular embodiment of a barcode reader 500 is disclosed, this disclosure is applicable to a variety of barcode readers, including, but not limited to, gun-type handheld readers, mobile computer-type readers, presentation readers, etc.

Referring now to the drawings, FIG. 11 illustrates an exemplary barcode reader 500 having a housing 502 with a handle portion 504, also referred to as a handle 504, and a head portion 506 (also referred to as a scanning head 506). Depending on the implementation, the housing 502 includes or is the chassis 150. The head portion 506 includes a window 508, and is configured to be positioned on the top of the handle portion 504. In some implementations, the window 508 may be the window 266 and/or the window 310 discussed with regard to FIGS. 3 and 7 above. The handle portion 504 is configured to be gripped by a reader user (not shown) and includes a trigger 510 for activation by the user. Optionally included in an embodiment is a base (not shown), also referred to as a base portion, which may be attached to the handle portion 504 opposite the head portion 506, and is configured to stand on a surface and support the housing 502 in a generally upright position. The barcode reader 500 can be used in a hands-free mode as a stationary workstation when it is placed on a countertop or other workstation surface. The barcode reader 500 can also be used in a handheld mode when it is picked up off the countertop or base station, and held in an operator's hand. In the hands-free mode, products can be slid, swiped past, or presented to the window 508 for the reader to initiate barcode reading operations. In the handheld mode, the barcode reader 500 can be moved towards a barcode on a product, and the trigger 510 can be manually depressed to initiate imaging of the barcode.

Other implementations may provide only handheld or only hands-free configurations. In the embodiment of FIG. 11, the reader 500 is ergonomically configured for a user's hand as a gun-shaped housing 502, though other configurations may be utilized as understood by those of ordinary skill in the art. As shown, the lower handle 504 extends below and rearwardly away from the body 502 along a centroidal axis obliquely angled relative to a central FOV axis of a FOV of an imaging assembly within the scanning head 502.

For at least some of the reader embodiments, an imaging assembly includes a light-detecting sensor or imager 511 operatively coupled to, or mounted on, a printed circuit board (PCB) 514 in the reader 500 as shown in FIG. 12. Depending on the implementation, the imaging assembly may be or may include imaging system 110. Similarly the PCB 514 may be the PCB or circuit board 102 of the scan engine device 100. In an embodiment, the imager 511 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 515 over a field of view along an imaging axis 517 through the window 508. In some implementations, the imaging lens assembly 515 includes elements of or the entirety of the rolling shutter rolling shutter sensor system 300. Similarly, in some implementations, the imager 511 is the imager 325 and/or an imager of imaging system 110. The return light is scattered and/or reflected from a target 513 over the field of view. The imaging lens assembly 515 is operative for focusing the return light onto the array of image sensors to enable the target 513 to be read. In particular, the light that impinges on the pixels is sensed and the output of those pixels produce image data that is associated with the environment that appears within the FOV (which can include the target 513). This image data is typically processed by a controller (usually by being sent to a decoder) which identifies and decodes decodable indicia captured in the image data. Once the decode is performed successfully, the reader can signal a successful "read" of the target 513 (e.g., a barcode). The target 513 may be located anywhere in a working range of distances between a close-in working distance (WD1) and a far-out working distance (WD2). In an embodiment, WD1 is about one-half inch from the window 508, and WD2 is about thirty inches from the window 508.

An illuminating light assembly may also be mounted in the imaging reader 500. The illuminating light assembly includes an illumination light source, such as at least one light emitting diode (LED) 519 and at least one illumination lens 521, and preferably a plurality of illumination LEDs and illumination lenses, configured to generate a substantially uniform distributed illumination pattern of illumination light on and along the target 513 to be read by image capture. In a preferred embodiment, the illuminating light assembly is illumination module 180, described in detail with regard to optical assembly 400 of the illumination module 180 in FIG. 8 above. At least part of the scattered and/or reflected return light is derived from the illumination pattern of light on and along the target 513.

An aiming light assembly may also be mounted in the imaging reader 500 and preferably includes an aiming light source 523, e.g., one or more aiming LEDs or laser light sources, and an aiming lens 525 for generating and directing a visible aiming light beam away from the reader 500 onto the target 513 in the direction of the FOV of the imager 511. In a preferred embodiment, the aiming light assembly is aiming module 170 as described with regard to FIG. 6 above.

Further, the imager 511, the illumination source 519, and the aiming source 523 are operatively connected to a controller or programmed microprocessor 107 operative for controlling the operation of these components. A memory 529 is connected and accessible to the controller 107. Preferably, the microprocessor 107 is the same as the one used for processing the captured return light from the illuminated target 513 to obtain data related to the target 513. Though not shown, additional optical elements, such as collimators, lenses, apertures, compartment walls, etc. As discussed with regard to FIGS. 1-9 are provided in the head portion 506 of the housing. Although FIG. 12 shows the imager 511, the illumination source 519, and the aiming source 523 as being mounted on the same PCB 514, it should be understood that different embodiments of the reader 500 may have these components each on a separate PCB, or in different combinations on separate PCBs. For example, in an embodiment of the reader, the illumination LED source is provided as an off-axis illumination (i.e., has a central illumination axis that is not parallel to the central FOV axis).

The above description refers potential embodiments of the accompanying drawings. Alternative implementations of the examples represented by the drawings include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for an imaging engine having an imaging assembly having a field of view (FOV), the method comprising:
   detecting, by a microprocessor, a presence of an aim light pattern within the FOV;
   determining, by the microprocessor and in response to the detecting, a target distance of an object in the FOV based on a position of the aim light pattern in the FOV, the target distance being a distance from the imaging engine to the object;
   causing, by the microprocessor, a variable focus optical element to focus on the object based on the target distance; and
   responsive to making a first determination, by the microprocessor, selecting, based on the target distance, one of a plurality of zoom operation modes,
   wherein the plurality of zoom operation modes includes at least two of: (i) an image binning mode. (ii) an image cropping mode, and (iii) an image interleaving mode.

2. The method of claim 1, wherein selecting one of the plurality of zoom operation modes includes:
   responsive to determining the target distance to be less than a lower threshold value, selecting the image binning mode;
   responsive to determining the target distance to be greater than an upper threshold value, selecting the image cropping mode; and
   responsive to determining the target distance to be between the lower threshold value and the upper threshold value, selecting the image interleaving mode.

3. The method of claim 2, wherein the lower threshold value is at most 12 inches and the upper threshold value is at least 24 inches.

4. The method of claim 1, wherein the variable focus optical element is one of a ball-bearing motor lens, a liquid lens, a T-len, or a voice coil motor lens.

5. The method of claim 1, wherein the object is a barcode, further comprising:
   cropping a region of interest (ROI) including the barcode; and
   decoding the barcode.

6. The method of claim 1, further comprising displaying, to a user, the target distance on a display communicatively coupled to the microprocessor.

7. An imaging engine having an imaging assembly having a field of view (FOV) and comprising:
   a variable focus optical element disposed along an optical axis to receive light from an object;
   an imaging sensor disposed along the optical axis to receive light from the variable focus optical element;
   a digital zoom module configured to modify an image received from the imaging sensor;
   an aiming module configured to generate and direct an aim light pattern; and
   a microprocessor and computer-readable media storing machine readable instructions that, when executed, cause the imaging engine to:
   detect a presence of the aim light pattern in the FOV;
   responsive to the detecting, determine a target distance of the object in the FOV based on a position of the aim light pattern in the FOV, the target distance being a distance from the imaging engine to the object; and responsive to making a first determination, select, based on the target distance, one of a plurality of zoom operation modes;

wherein the variable focus optical element, the digital zoom module, and the aiming module are communicatively coupled to the microprocessor, wherein selecting one of the plurality of zoom operation modes includes:

responsive to determining the target distance to be less than a lower threshold, selecting an image binning mode;

responsive to determining the target distance to be greater than an upper threshold value, selecting an image cropping mode: and responsive to determining the target distance to be between the lower threshold value and the upper threshold value, selecting an image interleaving mode.

8. The imaging engine of claim 7, wherein the digital zoom module is configured to, responsive to selecting the image binning mode, bin pixels of the image using at least one of: 2×2 pixel binning, 3×3 pixel binning, or 4×4 pixel binning.

9. The imaging engine of claim 7, wherein the digital zoom module is configured to, responsive to selecting the image cropping mode, crop a portion of the image sized to at least one quarter of the image.

10. The imaging engine of claim 7, wherein the digital zoom module receives the image with a resolution of at least 3 megapixels and zooms on the image with a resolution in a range of 0.5 to 2 megapixels.

11. The imaging engine of claim 7, wherein selecting the zoom operation mode includes:

responsive to determining the target distance to be less than a first lower threshold, selecting an image binning mode;

responsive to determining the target distance to be greater than a first upper threshold value, selecting an image cropping mode; and responsive to determining the target distance to be between the first lower threshold value and the first upper threshold value, selecting an image interleaving mode.

12. The imaging engine of claim 11, wherein the first upper threshold value and the second upper threshold value are equal.

13. The imaging engine of claim 12, wherein the first upper threshold value and the second upper threshold value are at least 40 inches, the first lower threshold value is at most 8 inches, and the second lower threshold value is at most 24 inches.

14. The imaging engine of claim 7, wherein the imaging sensor is a rolling shutter sensor configured to operate in at least (i) a first state wherein an obfuscator of the rolling shutter sensor obfuscates a majority of radiation propagating along the optical axis and (ii) a second state wherein the obfuscator of the rolling shutter sensor transmits a majority of radiation propagating along the optical axis.

15. The imaging engine of claim 14, wherein the rolling shutter sensor is communicatively coupled to the microprocessor, and wherein the machine readable instructions, when executed, further cause the imaging engine to transition the rolling shutter sensor between the first state and the second state.

16. The imaging engine of claim 14, wherein the rolling shutter sensor has a pixel size of at most 2.0 micrometers.

17. The imaging engine of claim 7, wherein the aiming module includes at least:

a beam source assembly having a beam source for generating the aim light pattern from an exit surface, wherein the exit surface defines a central axis along which an input light is to propagate; and a collimator assembly having a lens group that defines a tilt axis, wherein the tilt axis has a tilt angle relative to the central axis and the lens group is positioned to deflect the aim light pattern from the central axis onto the tilt axis.

18. The imaging engine of claim 7, wherein the aiming module generates and directs the aim light pattern in a pulsed laser driving mode.

19. The imaging engine of claim 7, wherein the aim light pattern has a wavelength of at least 505 nanometers and at most 535 nanometers.

20. The imaging engine of claim 7, wherein the variable focus optical element is one of a ball-bearing motor lens, a liquid lens, a T-len, or a voice coil motor lens.

21. The imaging engine of claim 20, wherein the variable focus optical element is the ball-bearing motor lens having a pupil diameter of at least 2.0 millimeters and a focus range from 3 inches to infinity.

22. The imaging engine of claim 7, wherein the object is a barcode and wherein the machine readable instructions, when executed, further cause the imaging engine to decode the barcode.

* * * * *